Jan. 23, 1951  A. T. GORMAN  2,538,834
FLUID PRESSURE BRAKE CHARGING CONTROL APPARATUS
Filed Sept. 22, 1948
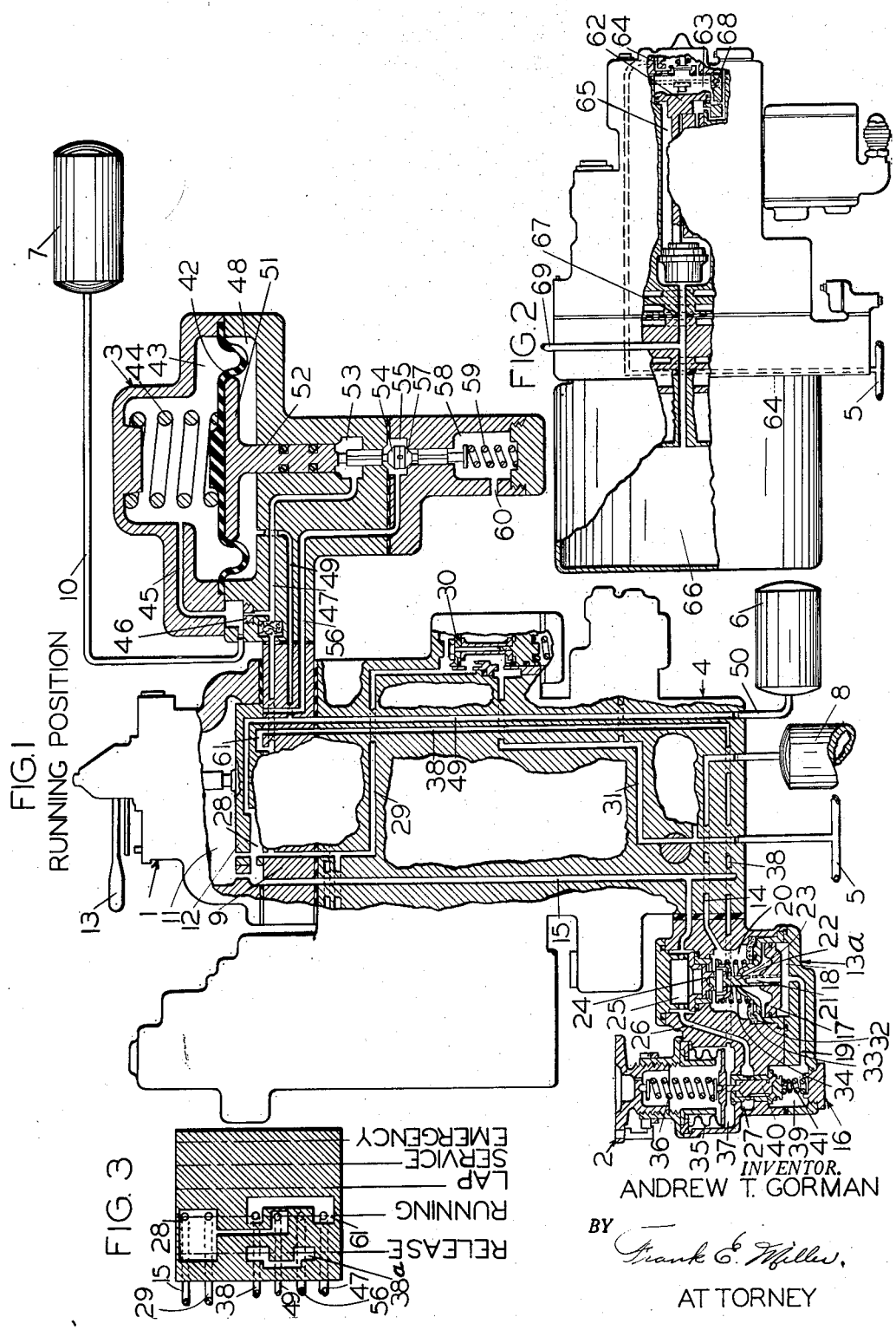
INVENTOR.
ANDREW T. GORMAN
BY Frank E. Miller
ATTORNEY Patented Jan. 23, 1951

2,538,834

UNITED STATES PATENT OFFICE 2,538,834

FLUID PRESSURE BRAKE CHARGING CONTROL APPARATUS

Andrew T. Gorman, Pitcairn, Pa., assignor to The Westinghouse Air Brake Company, Wilmerding, Pa., a corporation of Pennsylvania Application September 22, 1948, Serial No. 50,645

6 Claims. (Cl. 303—59)

This invention relates to locomotive fluid pressure brake equipment for controlling the application and release of brakes on railway trains and more particularly to means for controlling the charging and recharging of the brake pipe and brake equipment thereon.

The usual automatic type locomotive brake equipment comprises a main reservoir, a brake pipe, a feed valve device, a brake controlling valve device and an engineer's automatic brake valve device.

The engineer's brake valve device is provided with a release position in which position fluid from the main reservoir, at higher than normal brake pipe pressure, is supplied directly to the brake pipe. The brake valve device is also provided with a running position in which fluid is supplied from the main reservoir to the brake pipe through the feed valve device which reduces the pressure of such fluid to the normal degree desired to be carried in the brake pipe.

When initially charging the brake equipment on a railway train, as well as when recharging the equipment to effect a release of a brake application, it is customary for the engineer on the locomotive to move the handle of the brake valve device first to the release position and then after an interval of time to the running position where it remains until it is desired to effect an application of the brakes on the train. In release position of the brake valve device, the fluid at main reservoir pressure supplied to the brake pipe accelerates charging of the brake pipe and hastens release of brakes through the train subsequent to an application thereof.

If the brake valve device is allowed to remain in release position too long the pressure of fluid obtained in the brake pipe at the locomotive and on a number of adjacent cars of the train will increase to a degree above that normally carried, and from this higher than normal pressure, the auxiliary reservoirs on said cars and a corresponding volume, on the locomotive, such as the pressure chamber of a distributing valve device, will become gradually charged to a pressure higher than normally carried in the brake pipe. If this occurs, then when the brake valve handle is moved to running position and brake pipe pressure at the head end of the train, by flow back through the train, reduces to the pressure of fluid supplied by the feed valve device, and brake controlling valve devices on the locomotive and adjacent cars of the train will be operated by the higher than normal brake pipe pressure in the reservoirs or pressure chamber, above mentioned, to their service application position and a quick service reduction in pressure in the brake pipe will be initiated which will be propagated serially from car to car through the train and thereby effect a brake application on the locomotive and all cars of the train. This is not only objectionable at a time when it is desired that the brakes be released but such an application is difficult and time consuming to release.

It will be apparent that such an undesired application of the brakes can be positively avoided if the brake valve handle is moved from release to running position soon enough to permit the brake pipe pressure to reduce to that supplied by the feed valve device before the pressure chamber and auxiliary reservoirs, above mentioned, become overcharged, that is, charged to a pressure in excess of normal brake pipe pressure. If the brake valve handle is however not allowed to remain in release position as long as possible without causing overcharging of the pressure chamber and auxiliary reservoirs, above mentioned, the full advantage of using release position of the brake valve device for the purpose above described is not realized.

The length of time which fluid at main reservoir pressure may be supplied to the brake pipe for charging the brake pipe varies according to different conditions, such as the pressure of fluid in the brake pipe at the time the brake valve handle is moved to release position and/or the length of the train. With the conventional brake equipment, the length of time which the brake valve handle is allowed to remain in release position is dependent entirely on the judgement of the engineer, with the result, that maximum advantage of the use of said release position may never be realized.

The principal object of the invention is therefore the provision of means for automatically controlling charging of the brake pipe on a train so as to obtain maximum advantage of supplying fluid at high main reservoir pressure to the brake pipe without danger of overcharging the brake equipment on the locomotive and cars adjacent thereto with the attendant undesired results above described.

Other objects and advantages will appear from the following more detailed description of my invention when read in connection with the accompanying drawings, wherein:

Fig. 1 is a diagrammatic view, mainly in section, of a portion of a locomotive fluid pressure brake equipment embodying one form of the invention;

Fig. 2 is a partial sectional view of a brake controlling valve device, such as a locomotive distributing valve device, embodying a modification of the invention; and Fig. 3 is a partial diagrammatic, development view of a rotary valve and seat of an automatic brake valve device shown in Fig. 1.

*Description, Fig. 1*

The locomotive brake equipment shown in Fig. 1 of the drawing comprises an engineer's automatic brake valve device 1, a feed valve device 2, a release control valve device 3, a pedestal 4, a brake pipe 5, volume reservoirs 6 and 7, and a main reservoir 8 adapted to be charged in the usual manner with fluid at a pressure higher than that normally carried in said brake pipe 5.

The feed valve device 2 and the engineer's brake valve device 1 are mounted on the pedestal 4, with the release control valve 3 mounted on a rotary valve seat member 9 of the engineer's brake valve device. The volume reservoir 7 is connected to the release control valve device 3 by a pipe 10. The brake pipe 5 is adapted to be connected to the usual brake pipe on the cars of a train and to the brake controlling valve device on the locomotive. The operation of the brake controlling valve devices on both the locomotive and cars of the train is controlled by varying the pressure of fluid in the brake pipe 5 in the usual manner.

The brake valve device 1 may be of the usual construction comprising a casing having a valve chamber 11 containing a rotary valve 12 having a sliding fit on the rotary valve seat member 9 and adapted to be rotated by a handle 13 to the usual positions designated by legends in Fig. 3. As well known, the release and running position of handle 13 are employed for charging the brake pipe 5, the service and emergency positions for reducing the pressure of fluid in said brake pipe for effecting, respectively, a service or an emergency application of brakes and the lap position is usually employed for limiting the degree of a service reduction in brake pipe pressure. Since this structure and its usual functions are so well known, no further description thereof is deemed essential in the present application except as required for an understanding of the invention as hereinafter set forth.

The feed valve device 2 comprises a supply portion 13a, which is operative to supply fluid under pressure received from the main reservoir 8 through a passage 14 to the brake pipe 5 by way of a passage 15 and the brake valve device 1, and a regulating portion 16 which controls the operation of said supply portion and thereby the pressure of fluid thus supplied to the brake pipe.

The supply portion 13 of the feed valve device embodies a piston 17 having at one side thereof a control chamber 18, which is in communication by way of a passage 19 with the regulating portion 16, and at the opposite side thereof a valve chamber 20 which is connected by way of passage 14 to the main reservoir 8. A passage 21 leads through the piston 17 to establish communication between chambers 18 and 20, which communication is restricted by a choke 22 in said passage.

Contained in the valve chamber 20 and mounted on a stem 23 of the piston 17 for movement therewith is a relatively large flow capacity valve 24 which controls communication between the valve chamber 20 and a delivery chamber 25.

The delivery chamber 25 is open by way of a passage 26 to a chamber 27 in the regulating portion 16, and when the brake valve handle 13 is in release or running position, chamber 25 is open to the brake pipe 5 by way of passage 15, a port or cavity 28 in the rotary valve 12, a passage 29, a normally unseated cut-off valve 30 and a passage 31. In all other positions of the brake valve handle 13 passage 29 is disconnected from passage 15 and lapped by the rotary valve 12. A piston guide 32 serves as a support for a strainer 33 and a spring 34. The strainer 32 protects choke 22 from dirt which may enter chamber 20 from main reservoir 8 and the spring 34 engages valve 24 constantly urging said valve toward its seated position in which it is shown in Fig. 1.

The supply portion 13 is controlled by pressure of fluid in chamber 18 and for controlling such pressure the regulating portion 16 is provided which comprises a flexible, bellows type diaphragm 35 subject on one side to the force of an adjustable regulating spring 36. At the opposite side of diaphragm 35 is a chamber 37 which is connected by a passage 38 to the seat of rotary valve 12 of the brake valve device 1. A chamber 39 which is connected by passage 19 to the control chamber 18 in the supply portion is also connected to chamber 27 by a bore in which is slidably mounted the fluted stem of a regulating valve 40. The stem of valve 40 also extends through a casing bore in slidable contact therewith into chamber 37 wherein it engages the diaphragm 35. When the force of the regulating spring 36 exceeds the pressure of fluid in chamber 37 the diaphragm 35 unseats valve 40, and when less, a spring 41 acting against valve 40 seats said valve.

The release control valve device 3 may comprise a flexible diaphragm 42 subject on one side to fluid pressure in a chamber 43 and to the force of a spring 44. Chamber 43 is connected by a passage 45 and pipe 10 to the volume reservoir 7 and by a choke 46 to a passage 47. The opposite side of diaphragm 42 is subject to pressure of fluid in a chamber 48 which is connected by a passage 49 to the seat of the rotary valve 12 of the brake valve device and by a pipe 50 to the volume reservoir 6. A diaphragm follower 51 contained in chamber 48 is provided with an integral stem 52 which extends through a suitable bore in the casing in sealing engagement with the wall of said bore, and into a chamber 53 where it engages the fluted stem of a valve 54. Chamber 53 is in continuous communication through passage 47 with the brake pipe passage 29. Valve 54 is located in a chamber 55 which is connected to the seat of rotary valve 12 by a passage 56, said chamber also containing an oppositely and co-axially arranged valve 57. Valve 57 has a fluted stem which extends through a suitable bore in the casing into a chamber 58 wherein it is engaged by a spring 59 which urges said valve to an unseated position and at the same time urges the valve 54 to a seated position. Chamber 57 is open to atmosphere by way of a port 60.

*Operation, Fig. 1*

The locomotive brake equipment is initially charged at the locomotive shed as the main reservoir 8 is charged and during this charging operation, the brake valve handle 13 is placed in running position, in which it is shown in the drawing, and the angle cocks (not shown) at both ends of the brake pipe on the locomotive are closed.

As the main reservoir 8 is thus charged, fluid under pressure therefrom enters the pedestal 4 and flows by way of passage 14 to chamber 20 of the supply portion of the feed valve device 2. From chamber 20 fluid under pressure flows through choke 22 and passage 21 to chamber 18 and thence by passage 19 to chamber 39 in the regulating portion 16 of the feed valve device 2.

Chamber 37 in the regulating portion of the feed valve device is connected by passage 38, a cavity 61 in the rotary valve 12, and passages 47 and 29 to the brake pipe 5. With brake pipe pressure lower than normal, the force of spring 36 against the bellows diaphragm 35 exceeds the pressure of fluid from the brake pipe 5 acting in chamber 37 against said diaphragm, as a result of which, the valve 40 is unseated by spring 36 against the force of spring 41. Fluid under pressure supplied to the control chamber 18 is therefore permitted to flow from said chamber to the brake pipe 5 by way of passage 19, chamber 39, unseated valve 40, chamber 27 and passage 26 to the feed valve delivery chamber 25 and thence by way of passage 15, cavity 28 in the rotary valve 12, and passages 29 and 31, at a rate exceeding the rate of supply through choke 22. Fluid at main reservoir pressure in chamber 20, acting on piston 17, will therefore cause said piston to move in the direction of chamber 18 and unseat valve 24 to admit fluid under pressure from chamber 20 to the delivery chamber 25 and thence by passage 15, cavity 28 and passages 29 and 31 to the brake pipe 5. At the same time fluid under pressure from cavity 28 of the rotary valve 12 flows by way of passage 49 to charge chamber 48 of the release control valve device 3 and by pipe 59 to charge the reservoir 6.

As fluid pressure is thus established in passage 29, and therefore in the brake pipe 5, fluid under pressure flows from said passage by way of passage 47 to chamber 53 and through choke 46 to charge chamber 43 and reservoir 7 by way of pipe 10. Fluid under pressure from the brake pipe passage 29 and passage 47 also flows by way of cavity 61 in the brake valve device and passage 38 to chamber 37 of the control portion of the feed valve device 2. The valve 24 in the feed valve supply portion 13 remains open as above described, allowing fluid under pressure to flow from the main reservoir 8 to the brake pipe 5, to chambers 37, 43, and 48 and to reservoirs 7 and 6 until the pressure of fluid in chamber 37 acting against diaphragm 35 exceeds the pressure of the regulating spring 36 at which time the diaphragm moves against said spring to permit spring 41 to seat valve 40. With valve 40 seated, chamber 18 is quickly charged to main reservoir pressure by way of choke 22 and passage 21. Spring 34 then becomes effective to move piston 17 toward chamber 20 to seat valve 24 and prevent further flow of fluid under pressure to the brake pipe 5 and to the various chambers and reservoirs, thereby limiting the pressure of such fluid to the normal degree determined by the adjustment of spring 36.

With the locomotive brake equipment thus charged with fluid under pressure, the engineer may move the locomotive to couple to a train of cars, at which time, the brake valve handle 13 is moved to lap position in which position fluid at normal brake pipe pressure in chamber 48 and reservoir 6 is bottled up by reason of the rotary valve 12 lapping passage 49. The usual angle cocks (not shown) in the brake pipe connecting the locomotive and the train of cars will then be opened. The pressure of fluid in the locomotive brake pipe 5 will then reduce by flow into the train brake pipe, and the pressure of fluid in chamber 43 and reservoir 7 will correspondingly reduce through choke 46 and passages 47 and 29 into the locomotive brake pipe. Fluid at normal brake pipe pressure being retained in chamber 48, the diaphragm 42 moves in the direction of chamber 43 when, by reason of the reduction of pressure in chamber 43, a certain differential, say three pounds, is created between the fluid pressure in chambers 43 and 48 acting on said diaphragm. Spring 59 acting on valve 57 will then unseat said valve and seat valve 54, and chamber 55 and passage 56 will thus be connected past valve 57 to chamber 58 and to atmosphere by way of port 60, the opposite end of said passage being lapped by the brake valve rotary valve 12 in the lap position thereof.

When brake pipe pressure on the locomotive has substantially equalized into the train brake pipe as just described, the operator will move the brake valve handle 13 from lap position to release position wherein passage 15 is connected through a cavity 28 (Fig. 3) in the rotary valve 12 to the brake pipe passage 29 and the feed valve control passage 38 is connected through a cavity 38a to passage 55 and to atmosphere past valve 57, passage 49 remaining lapped by the rotary valve 12, as occurs in all positions of said rotary valve except running, to hold the fluid at normal brake pipe pressure bottled up in diaphragm chamber 48 and reservoir 6. Fluid pressure in chamber 37 of the feed valve device 2 is thus vented to atmosphere rendering spring 36 effective to unseat valve 40 to vent fluid under pressure from chamber 18 through chamber 39, chamber 27 and passage 26 to the brake pipe 5 by way of chamber 25 and passages 15, 29 and 31, at a rate exceeding the supply capacity of choke 22, as a result of which, main reservoir pressure in chamber 20, effective on piston 17, will move said piston toward chamber 18 and unseat valve 24 to permit fluid at supply pressure in main reservoir 8 to flow to the brake pipe 5 by way of passages 15, 29 and 31, to charge the brake pipe on the locomotive and train, the flow capacity of valve 24 being such as to offer substantially no restrictions to the flow of fluid under pressure from the main reservoir whereby the pressure of fluid obtained in the brake pipe at the locomotive will quickly increase to substantially that in the main reservoir.

As fluid at main reservoir pressure is thus supplied to the brake pipe 5 by way of passage 29 fluid also flows from said passage through passage 47 and choke 46 to recharge chamber 43 and reservoir 7, the flow capacity of said choke 46 being so related to the combined volumes of said chamber and reservoir as to permit recharge of said chamber and reservoir at approximately the same rate as the pressure chamber in the usual distributing valve device or the like (not shown) on the locomotive or the usual auxiliary reservoir on the leading car of the train becomes recharged with fluid under pressure from the brake pipe. When chamber 43 and reservoir 7 thus become recharged to within three pounds of the pressure in chamber 48 (charged with fluid at normal brake pipe pressure), the diaphragm 42 moves under the influence of spring 44 to the position in which it is shown in the drawing, in which position valve 57 is seated and valve 54 is unseated.

The opening of valve 54, as just mentioned, connects chamber 37 of the regulating portion 16 of the feed valve device to the brake pipe passage 29 via passage 38, passage 56, cavity 61 in the brake valve rotary valve 12, chamber 53 and passage 47. Fluid at the pressure being supplied the brake pipe 5 by way of passage 29 is then supplied to chamber 37 and when this pressure exceeds the adjustment of spring 36, as explained above, diaphragm 35 is moved against said spring to permit spring 41 to seat valve 40. The flow of fluid under pressure from chamber 16 past valve 40 is thus cut off and fluid pressure in chamber 20 quickly equalizes into chamber 18 to render spring 34 effective to seat valve 24 and cut off further supply of fluid at main reservoir pressure to passage 29 and to the brake pipe.

It is desired to here point out that the diaphragm 42 is deflected by spring 44 to disconnect chamber 37 in the feed valve device from atmosphere past valve 57 and to connect said chamber to the brake pipe passage 29 when the pressure of fluid in diaphragm chamber 43, and hence in the pressure chamber of the usual locomotive distributing valve device and in the auxiliary reservoirs on cars adjacent the locomotive is increased to within a slight degree of normal brake pipe pressure, as governed by said fluid at normal brake pipe pressure present in diaphragm chamber 48 and that at the time of this operation the pressure of fluid in the brake pipe at the locomotive may be substantially equal to that in the main reservoir 8 and hence in excess of normal brake pipe pressure. As a result, when diaphragm chamber 37 in the feed valve device is disconnected from atmosphere and connected to the brake pipe passage 29 the feed valve device will immediately operate to cut off supply of fluid under pressure from the main reservoir 8 to the brake pipe as above described.

However, after the feed valve device operates to cut off supply of fluid under pressure from the main reservoir to the brake pipe 5 as just mentioned, the pressure of fluid in the brake pipe adjacent the locomotive of a train will reduce by flow back through the train and when reduced to a certain degree below normal, such reduced pressure effective in chamber 37 will permit spring 36 to partially reopen valve 40 for releasing fluid under pressure from the supply piston chamber 18 at such a rate that the piston 17 will open valve 24 just sufficient to permit further flow of fluid under pressure to the brake pipe 5 as required to maintain the brake pipe pressure at the locomotive, and hence the pressure in diaphragm chamber 37, substantially equal to or slightly less than the normal degree, against the flow back through the train, for charging the brake pipe and brake equipments thereon. As soon as the brake pipe and brake equipments throughout the train then become fully charged, the brake pipe pressure at the locomotive acting in chamber 37 on diaphragm 35 will deflect same against spring 36 to permit seating of valve 40 and hence closing of valve 24 to prevent further supply of fluid under pressure to the brake pipe.

From the above description it will be readily apparent that if the pressure of fluid in the brake pipe 5 is reduced as a result of effecting a service or an emergency application of brakes, that upon movement of the brake valve handle 13 to release position, the apparatus will automatically operate to permit flow of fluid at the pressure in main reservoir 8 directly to the brake pipe until the pressure of fluid in diaphragm chamber 43 of the release valve device is increased to within a slight degree of normal brake pipe pressure acting in chamber 48, at which time further supply of fluid to the brake pipe will be limited to the normal degree by subjecting diaphragm 35 in the feed valve device to brake pipe pressure effective in passage 29.

Any time after the release valve device 3 has operated to connect diaphragm chamber 37 in the feed valve device to the brake pipe passage 29, so that said device will operate to limit pressure of fluid supplied to the brake pipe to the normal degree, the brake valve handle 13 may be moved out of release position to running position in which the feed valve device will continue to limit pressure of fluid supplied to the brake pipe as just mentioned, and in which diaphragm chamber 48 and reservoir 6 will be reopened to the brake pipe passage 29 by way of passage 49, cavity 61 in the rotary valve 12 and passage 47 whereby the pressure of fluid in chamber 48 and reservoir 6 will be readjusted, if necessary, to normal brake pipe pressure in passage 29 for controlling recharging of the brake pipe subsequently, when necessary.

It will be noted that the brake valve handle 13 must be moved to running position to permit readjustment of pressure of fluid in the diaphragm chamber 48. Such movement is not however necessary if there is no change in normal brake pipe pressure or in pressure of fluid in chamber 48, as might occur in case of leakage therefrom, and the time of such movement subsequent to effecting a release of brakes and prior to effecting an application of brakes is immaterial since recharging of the brake pipe and brake equipments on a train is automatically controlled by the release valve device 3 and for device 2 in release position of said handle.

As well known, different normal pressures of fluid are carried in the brake pipe 5 in different types of service, and even in the same type of service under different conditions, but this will have no effect upon operation of the release valve device 3 to control recharging of the train, for the controlling pressure of fluid in diaphragm chamber 48 will always be adjusted in running position of the brake valve handle 13 according to whatever normal pressure is present in the brake pipe.

It will now be seen that with chamber 48 and reservoir 6 charged with fluid at normal brake pipe pressure in running position of the brake valve handle 13 and held thus charged in all other positions of said handle, and with choke 46 and volume 7 properly proportioned, the valve device 3 will automatically control the feed valve device 2 in release position of the brake valve device to charge or recharge the brake pipe with fluid pressure from the main reservoir in such a manner as to obtain maximum advantage of the high pressure in the main reservoir for charging or recharging purposes without danger of overcharging the brake equipment on the locomotive and adjacent cars of a train, and without attention on the part of the engineer.

It will also be noted that the pressure of fluid in chamber 43 and volume 7 will reduce with each brake pipe reduction and that the time for recharging said chamber and volume is proportional to the time required to recharge the brake pipe and that it is therefore feasible to use the release position of the brake valve handle 13 for automatic recharging of the brake pipe after any degree of brake application without danger of overcharging the brake pipe.

*Description, Fig. 2*

The brake controlling valve device shown in Fig. 2 of the drawing may for example be the distributing valve device of the well known No. 8-ET Locomotive Brake Equipment, shown and described in The Westinghouse Air Brake Company's Instruction Pamphlet No. 5032-1, dated July 1943. The distributing valve device comprises an equalizing piston 62 at one side of which is a control chamber 63 open to the brake pipe 5 by a passage 64 and at the opposite side of which is a valve chamber 65 open through a passage 67 to a pressure chamber 66 by a passage 67. As is well known, upon a reduction in brake pipe pressure in chamber 63, the piston 62 is adapted to move to an application position for supplying fluid under pressure from chamber 66 to effect an application of brakes; while upon an increase in brake pipe pressure in chamber 63, said piston is adapted to move to a release position for effecting a release of brakes and a recharging of said pressure chamber with fluid under pressure from the brake pipe by way of a feed groove 88.

It is desired to point out that the pressure in pressure chamber 66 varies substantially the same as that in the auxiliary reservoir on the first car of a train, and hence, substantially the same as the pressure in reservoir 7 and in chamber 43 of the release control valve device 3, shown in Fig. 1 of the drawing varies through choke 46 upon reductions and increases in pressure in brake pipe 5. As will be evident therefore, if desired, in the equipment shown in Fig. 1 of the drawing the reservoir 7 could be dispensed with, the choke 46 could be replaced with a plug (not shown) and the distributing valve device shown in Fig. 2 could be modified by addition of a passage 69 connected to passage 67 and to which the pipe 10 could be connected, in which case, the pressure in diaphragm chamber 43 would vary the same as in the construction shown in Fig. 1 and the release valve device 3 would operate in the same manner and accomplish the same result as above described in connection with the structure shown in Fig. 1.

*Summary*

It will now be seen that by providing a fixed pressure, equal to normal brake pipe pressure, on one side of the diaphragm 42 of the release control device 3 and by varying the pressure on the other side as above described, the release control valve device 3 will automatically control operation of the feed valve device in release position of the brake valve device, in such a manner as to initially admit fluid at main reservoir pressure to the brake pipe for a maximum period of time which will not cause overcharging of the brake equipment on the locomotive and adjacent cars of a train and to then reduce the pressure of such fluid to that desired to be carried in the brake pipe. For initially charging a train or for releasing the brakes following an application, the engineer therefore need only move the brake valve handle 13 to release position whereupon such charging and for release of brakes will occur automatically in the shortest possible period of time without possibility of any objectionable operation.

Having now described my invention, what I claim as new and desire to secure by Letters Patent, is:

1. A fluid pressure brake equipment comprising in combination, a source of fluid under pressure, a feed valve device comprising a fluid pressure controlled pressure regulating portion and operative to supply fluid from said source to said brake pipe at a rate controlled by pressure of fluid on said regulating portion, a brake valve device having release and running positions and operative in said running position to subject said regulating portion to pressure of fluid in said brake pipe and means cooperative with said brake valve device in said release position to subject said regulating portion first to atmospheric pressure and then to pressure of fluid in said brake pipe.

2. A fluid pressure brake equipment comprising in combination, a source of fluid under pressure, a feed valve device comprising a fluid pressure controlled pressure regulating portion and operative to supply fluid from said source to said brake pipe at a pressure controlled by pressure of fluid on said regulating portion, a brake valve device having release and running positions for establishing fluid pressure supply communication between said feed valve device and brake pipe, release control means automatically operative in said release position to selectively subject said regulating portion to either atmospheric pressure or to pressure of fluid in said brake pipe, said brake valve device in said running position rendering said release control means ineffective to control said regulating portion and subjecting said regulating portion to pressure of fluid in said brake pipe.

3. A fluid pressure brake equipment comprising, in combination, a source of fluid under pressure, a feed valve device comprising a fluid pressure controlled pressure regulating portion and operative to supply fluid from said source to said brake pipe at a rate controlled by pressure of fluid on said regulating portion, a brake valve device having release and running positions for establishing fluid pressure supply communication between said feed valve device and brake pipe, a fluid pressure chamber, a restricted communication opening said chamber to said brake pipe, release control means controlled by pressure of fluid in said chamber in said release position of said brake valve device, and operative when such pressure is less than a chosen degree to subject said regulating portion to atmospheric pressure and when greater than said chosen degree to subject said regulating portion to pressure of fluid in said brake pipe, said brake valve device in said running position rendering said release control means ineffective to control said regulating portion and subjecting said regulating portion to pressure of fluid in said brake pipe.

4. In a fluid pressure brake equipment, the combination with a brake pipe, a source of fluid at a pressure in excess of that normally carried in said brake pipe, a feed valve device comprising a fluid pressure controlled regulating portion and operative to supply fluid under pressure from said source to said brake pipe when the pressure of controlling fluid in said regulating portion is below a chosen pressure, a control valve device controlled by opposing pressures of fluid in first and second chambers and operable by the pressure in said second chamber when a chosen degree less than in said first chamber to subject said regulating portion to atmospheric pressure and operable upon a less differential between the opposing pressures to subject said regulating portion to pressure of fluid in said brake pipe, a restricted communication opening said first chamber to said brake pipe, a brake valve device having a brake release position and a running position and comprising means operative in said release position to connect said regulation portion to said control valve device and to bottle up fluid under pressure in said second chamber and operative in said running position to open both said regulating portion and second chamber to said brake pipe.

5. A fluid pressure brake equipment comprising in combination, a source of fluid under pressure, a feed valve device comprising a fluid pressure controlled pressure regulating portion and operative to supply fluid from said source to said brake pipe at a rate controlled by pressure of fluid on said regulating portion, a brake valve device having release and running positions for establishing fluid pressure supply communication between said feed valve device and brake pipe, a fluid pressure chamber, a restricted communication opening said chamber to said brake pipe, a second chamber, said brake valve device in said running position opening said second chamber to said brake pipe for charging said second chamber with fluid at the pressure in said brake pipe and in said release position closing said second chamber for bottling up the fluid pressure therein, a movable abutment subject opposingly to pressures of fluid in said chambers, and valve means operative by said abutment when the pressure in said first chamber is a chosen degree less than in said second chamber to subject said regulating portion to atmospheric pressure and when the differential between pressures in said chambers is less than said chosen degree to subject said regulating portion to pressure of fluid in said brake pipe, said brake valve device in said running position subjecting said regulating portion to pressure of fluid in said brake pipe.

6. A fluid pressure brake equipment comprising in combination, a source of fluid under pressure, a feed valve device comprising a fluid pressure controlled pressure regulating portion and operative to supply fluid from said source to said brake pipe at a rate controlled by pressure of fluid on said regulating portion, a brake valve device having release and running positions for establishing a fluid pressure supply communication between said feed valve device and said brake pipe, a brake controlling valve device having a chamber from which fluid under pressure is adapted to be supplied to effect an application of brakes upon a reduction in brake pipe pressure and comprising restricted charging means for supplying fluid under pressure to said chamber upon an increase in pressure of fluid in said brake pipe, a release control device controlled by pressure of fluid in a second chamber acting in opposition to pressure of fluid in the first named chamber and operative when the pressure in said first chamber is a chosen degree less than in said second chamber to subject said regulating portion to atmospheric pressure and when the differential between the pressures in said first and second chambers is less than said chosen degree to subject said regulating portion to pressure of fluid in said brake pipe, said brake valve device in said running position opening said second chamber and said regulating portion to said brake pipe and in said release position bottling up fluid under pressure in said second chamber.

ANDREW T. GORMAN.

REFERENCES CITED

The following references are of record in the file of this patent:

UNITED STATES PATENTS

| Number | Name | Date |
| --- | --- | --- |
| 2,097,964 | Campbell | Nov. 2, 1937 |

FOREIGN PATENTS

| Number | Country | Date |
| --- | --- | --- |
| 473,987 | France | Oct. 25, 1937 |